United States Patent [19]

Giguere

[11] 4,284,901
[45] Aug. 18, 1981

[54] APPARATUS FOR UTILIZING TIDAL VARIATION TO GENERATE ELECTRICITY

[76] Inventor: A. Marcel Giguére, 2625 Regina St., Apt.#1008, Ottawa, Ontario, Canada, K2B 5W8

[21] Appl. No.: 19,414

[22] Filed: Mar. 12, 1979

[51] Int. Cl.³ ............................................. F03B 13/12
[52] U.S. Cl. ......................................... 290/53; 290/42
[58] Field of Search .............................. 290/42, 43, 53

[56] References Cited

U.S. PATENT DOCUMENTS

| | | | |
|---|---|---|---|
| 987,685 | 3/1911 | Atkinson | 290/42 X |
| 2,848,189 | 8/1958 | Caloia | 290/53 X |
| 3,567,953 | 3/1971 | Lord | 290/42 |
| 3,746,875 | 7/1973 | Donatelli | 290/42 |
| 3,964,264 | 6/1976 | Tornabene | 290/53 X |
| 3,988,592 | 10/1976 | Porter | 290/53 |

Primary Examiner—J. V. Truhe
Assistant Examiner—W. E. Duncanson, Jr.
Attorney, Agent, or Firm—Andrew James Richardson

[57] ABSTRACT

The need to utilize alternative power sources for generating electricity is answered by harnessing the power of the tides in oceans. A power unit consists of a float with an opening therethrough which permits the float to ascend and descend a fixed column mounted on the ocean floor, the float being responsive to the variation in tidal height. Force linking means connecting the column and float transmit the linear power to a suitable form for an electrical generating means mounted on the float. The types of force linking means include a gear rack and gear means; helical gear combination means, gear speed-multiplying means and piston means.

2 Claims, 4 Drawing Figures

APPARATUS FOR UTILIZING TIDAL VARIATION TO GENERATE ELECTRICITY

BACKGROUND OF THE INVENTION

There are stationary land installations which utilize the power of the tides to run electrical generators. However, specific circumstances of sea and land are requisites for this utilization.

In order to take advantage of tidal power existing over a wide area of the world a more adaptable means is required.

The ocean tide resource is continuous, everlasting, non-hazardous and non-pollutant. The system recommended to harness the ocean tide potential power is simple and inexpensive.

SUMMARY OF THE INVENTION

The system is composed of one or many large floating islands installed in appropriate locations in the ocean. The island is mounted on one or many columns or pistons, the base of which are fixed in the ocean floor. Each floating island goes up and down at the same rhythm and amplitude as the tide, and operates a gearing system which drives a generator mounted on the island, or a hydraulic system which activates one or many turbines coupled to the generator.

DESCRIPTION OF THE INVENTION

In drawings which illustrate embodiments of the invention,

To obtain maximum performance, the islands are installed in locations of the ocean where the combination of the following factors are most appropriate: The greater tide activity, in amplitude and frequency, the smaller ocean depth, and the closer to the continent. They are not installed in shipways nor where there are icebergs. Waves have no effect on the island's production capacity, neither do the ocean currents.

The floating island or float is very large, very heavy, and has a buoyancy factor of twice its weight. The greater its weight and buoyancy, the greater is its production capacity. The buoyancy factor of twice the weight is required to obtain equal lifting and lowering force.

The base of each column or piston is installed at right angles with the sea level; it is permanently fixed in the ocean floor, and braced solidly. The length of each column or piston equals the depth of the sea at high tide.

The linear mechanical power developed by the island vertical movements has two component forces. First, the lifting force developed during each ascending tide half cycle; this lifting force equals the island's buoyancy above its own weight. Secondly, the lowering force developed during each descending tide half cycle; this lowering force equals the island weight. The buoyancy of the island has to be twice its weight in order to obtain equal lifting and lowering forces. There are two short dead points during each tide cycle, one when the tide is shifting from ascending to lowering, and one when the tide is shifting from lowering to descending. These two dead points do not however interfere with the capacity of the island to continually produce electricity, i.e., without interruptions.

PREFERRED EMBODIMENTS OF THE INVENTION

Figure 1:
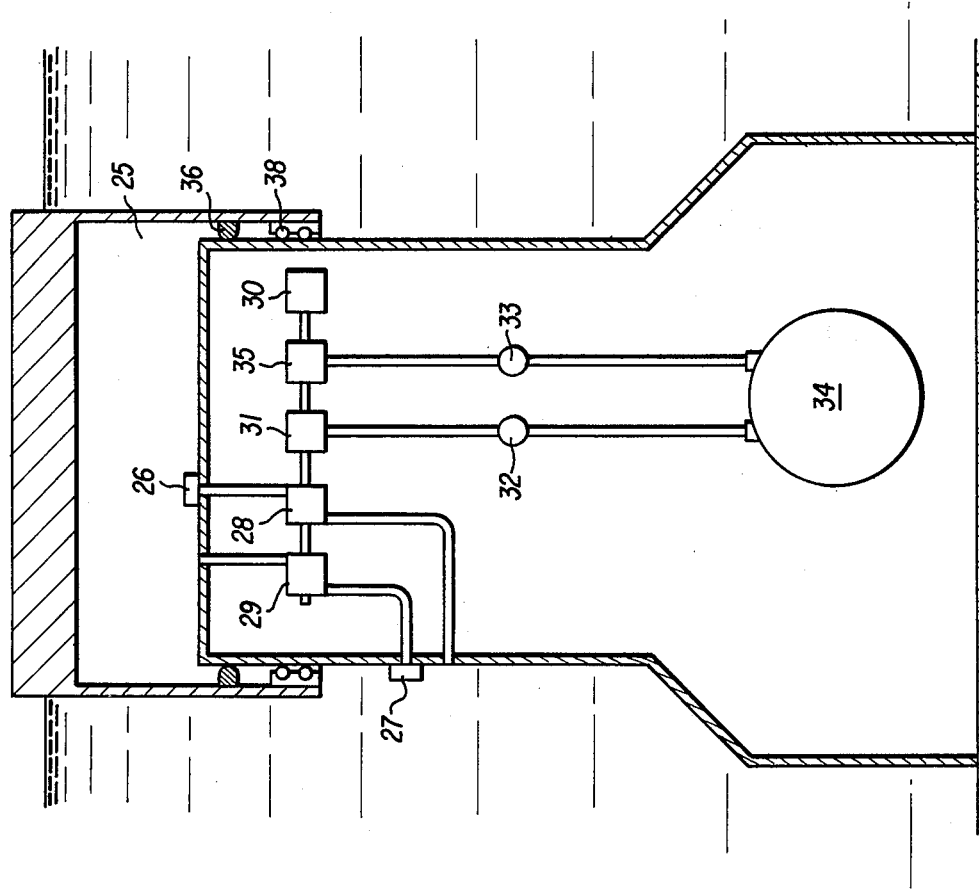
FIG. 1 is a standard gearing mechanism.

FIG. 1 illustrates a standard gearing mechanism to convert the linear lifting-lowering force into a rotating force to drive the generator.

As the tide rises the sprocket 2 engages the gear teeth 1 on the post. Sprocket 2 drives chain 3 which engages sprocket 5 and drives sprocket 5 at the same angular velocity as sprocket 2. Sprocket 5 is attached to sprocket 4 and causes sprocket 4 to rotate clockwise at the same velocity as sprocket 5. Sprocket 4 engages the spring loaded pawl 6 causing sprocket 7 to rotate at the same angular velocity as sprockets 2, 4 and 5. Sprocket 7 engages sprocket 8 causing sprocket 8 to rotate counterclockwise at a speed Nh/Nj times the speed of sprocket 7, where Nh and Nj are the number of teeth on sprocket 7 and 8 respectively. Sprocket 8 is attached to sprocket 9 causing sprocket 9 to rotate at the same velocity as sprocket 8. Sprocket 9 engages sprocket 10 causing sprocket 10 to rotate at an angular speed Ni/Nk times the speed of sprocket 9 where Ni and Nk are the number of teeth on sprockets 9 and 10 respectively. Sprocket 10 is attached to power shaft 11 which may be used to drive a generator.

Additional gearing stages may be used to further increase the angular velocity of the power shaft. A similar mechanism is mounted on the opposite side of the post which drives a power shaft as the tide falls.

Figure 2:
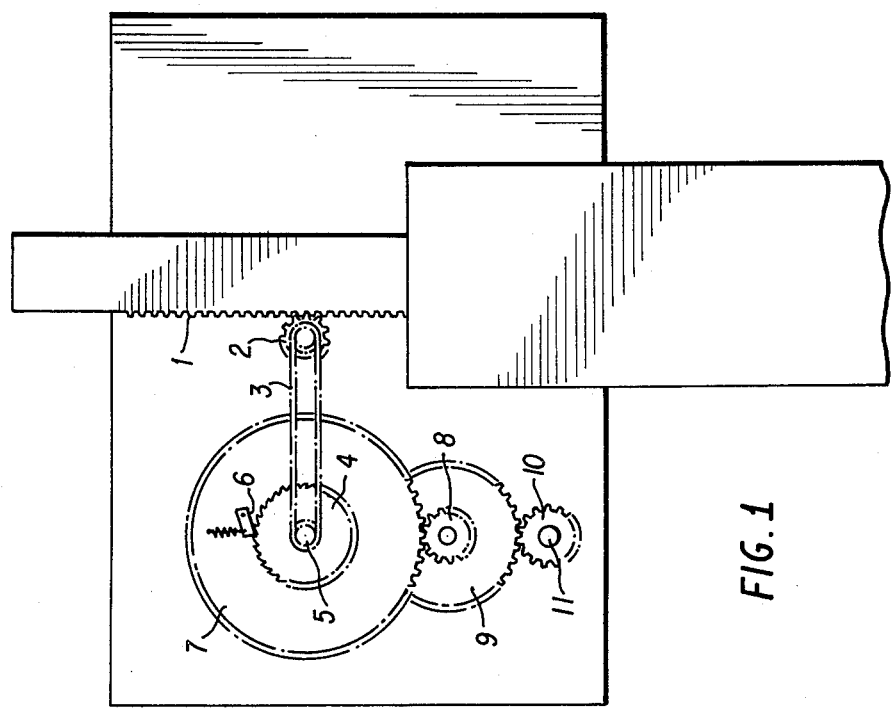
FIG. 2 is a hydraulic drive mechanism.

FIG. 2 illustrates an hydraulic mechanism to convert the linear lifting-lowering force into a rotating force to drive the generator.

When the tide is rising the island's buoyancy creates a reduced pressure in chamber 25 and check valve 26 opens. Check valve 27 closes. Water is drawn in through pipe 27 and drives turbine 29. The water flows into chamber 25 as the island floats upward.

When the tide is falling the weight of the island causes the pressure in chamber 25 to increase. Check valve 26 closes and check valve 27 opens. Water is forced from chamber through the turbine.

Both turbines may be mounted on the same shaft to drive a generator.

Fluid is compressed during lifting-lowering movement which operates the generator during the dead points of the tide cycle.

When the tide is rising the island's buoyancy creates a reduced pressure in chamber. Check valve 26 opens and check valve 27 closes. Water is drawn in through turbine 28 and drives the generator 30 and the air compressor 31. Valve 32 is open and valve 33 is closed. The reservoir 34 is pressurized.

The island is guided in its upward motion by guide wheels 38 and the chamber seal 36 which is also equipped with guide wheels to reduce friction.

When the tide is slack the turbines are disengaged from the shaft. The compressor 31 is also disengaged and valve 32 is closed. Valve 33 is opened and air is released from reservoir 34 into the air motor 35 which drives the power shaft and generator 30.

When the tide is falling the weight of the island compresses the fluid in chamber 25. Check valve 26 closes and check valve 27 opens. Fluid is forced through the turbine 29 and the turbine drives the generator 30 and the air compressor 31.

Figure 3:
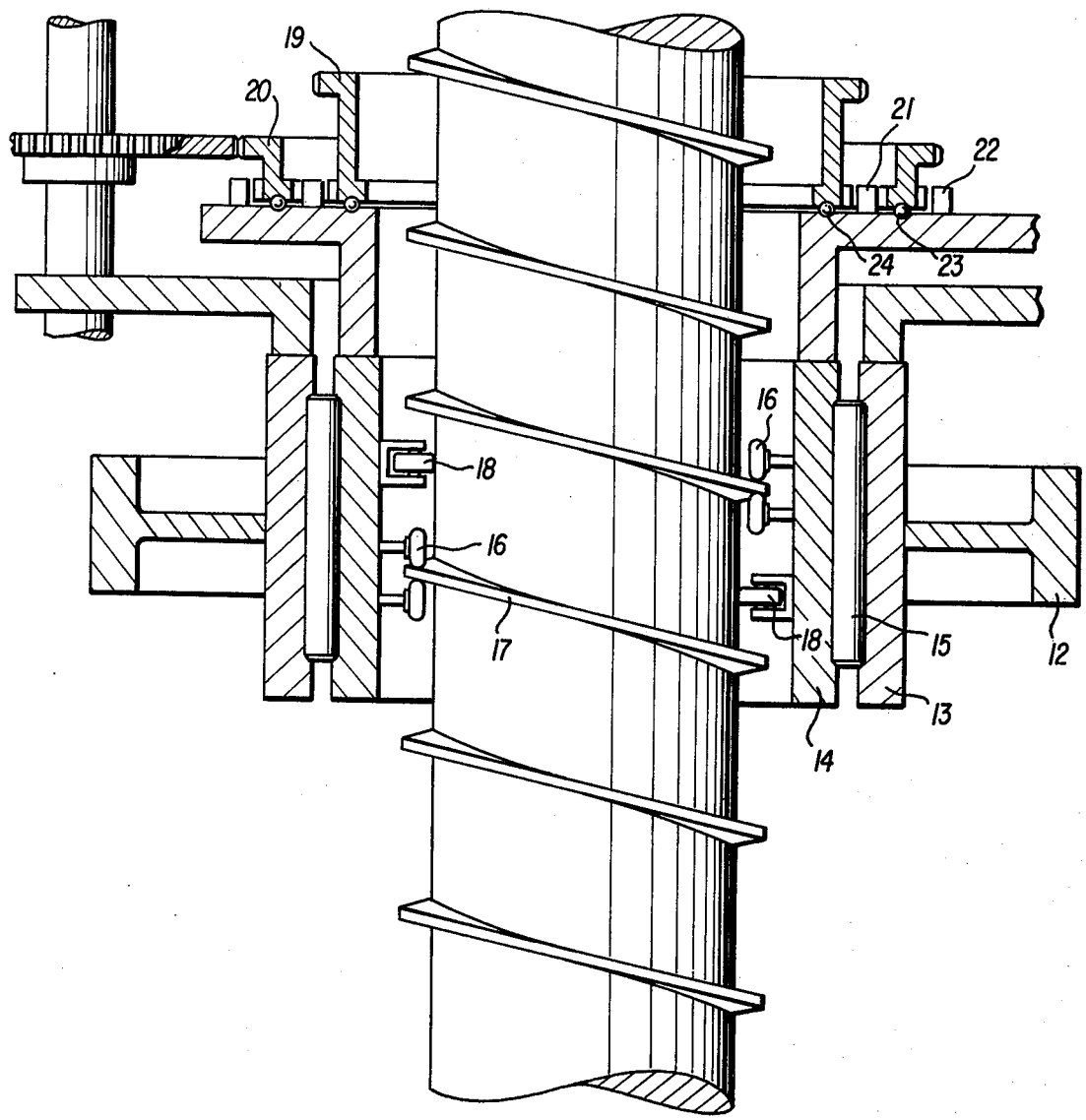
FIG. 3 is a helical drive mechanism.
Figure 4:
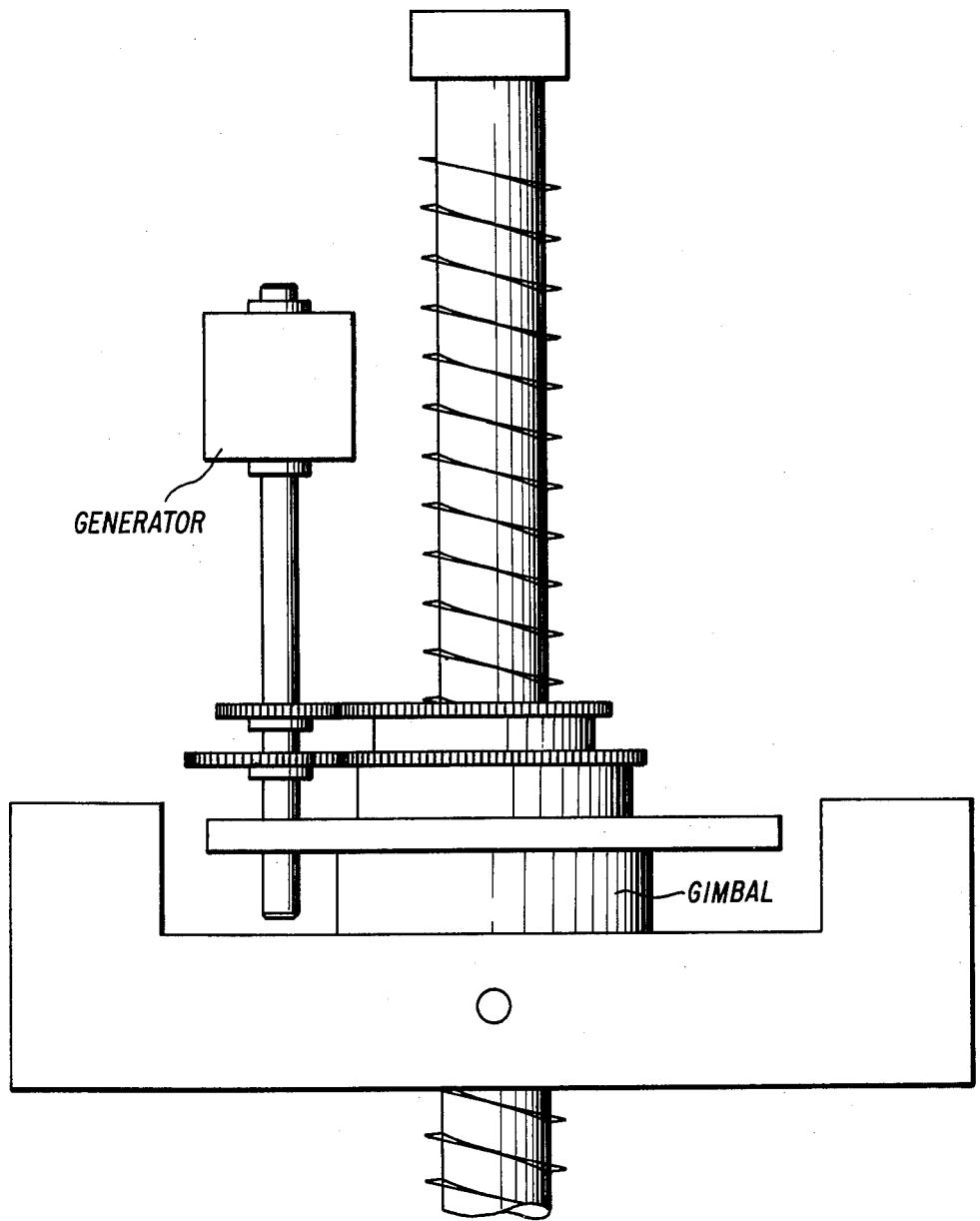
FIG. 4 is a helical drive mechanism.

FIGS. 3 and 4 illustrates a helical mechanism to convert the linear lifting-lowering force into a rotating force to drive the generator.

A gimbal mechanism may be used to attach the floating island to the column.

As the tide moves in the vertical direction the island exerts a force on the collar 12 of the gimbal mechanism which in turn exerts an upward or downward force on the collar 13 which is connected to collar 14 through roller bearings 15. The collar 13 transmits the upward or downward force to the wheels 16 which travel on the helical track 17 imparting a rotating motion to the collar 14. Guide wheels 18 act to keep the collar 14 centered on the post. The guide wheels swivel to permit them to follow the helical path forced upon them by the motion of collar 14.

The rotating power of collar 14 is transmitted to the power take-off gears 19 and 20. 19 is engaged by the pawl 21 when the collar 14 is rotating in the clockwise direction. 20 is engaged by pawl 22 when the collar 14 is rotating in the counterclockwise direction. Both 19 and 20 are mounted on bearings at 23 and 24 which ensure that the power take-off gears rotate freely unless engaged by a pawl.

What is claimed is:

1. Apparatus for producing electricity by harnessing the power of ocean tides comprising at least one power unit, said power unit in turn comprising:

a large column having an upper portion, said column being disposed in a vertical direction so that said column is substantially perpendicular to and the upper portion is generally below the surface of the ocean, said column being permanently fixed to the ocean bed and having a chamber therein;

a float having a chamber therein adjacent the center of gravity of the float, said float chamber being closed on top and of such size that the upper portion of said column is telescopically associated therewith so that the float may move vertically relative to said column and means associated with said float chamber and said column for providing sealed telescopic movement therebetween, said float having a buoyancy factor of twice its weight, a substantial portion of the float at all times being below the surface of the ocean;

means associated with said float chamber and said column chamber including conduit means and turbine means whereby movement of said float vertically upwardly and downwardly causes water to flow sequentially into said float chamber and from said chamber through said conduit means thereby driving said turbine means; and electrical generating means operatively connected with said turbine means whereby said generator means is driven by said turbine means.

2. The apparatus according to claim 1 further including air compressor storing means associated with said turbine means and electrical generator means for storing energy whereby said electrical generating means may be driven during slack tide periods by compressed air.

* * * * *